United States Patent [19]
Macpherson

[11] 3,951,551
[45] Apr. 20, 1976

[54] APPARATUS FOR TESTING THE FRONT WHEEL ALIGNMENT OF AUTOMOTIVE VEHICLES

[75] Inventor: Roger Macpherson, Rochester, N.Y.

[73] Assignee: American Tatra, Inc., Rochester, N.Y.

[22] Filed: Oct. 7, 1974

[21] Appl. No.: 512,193

[52] U.S. Cl. ............................... 356/155; 248/467; 350/307
[51] Int. Cl.² ...................................... G01B 11/275
[58] Field of Search ......... 356/155; 33/203, 203.12, 33/203.13; 350/307; 248/467

[56] References Cited
UNITED STATES PATENTS

| | | | |
|---|---|---|---|
| 3,501,240 | 3/1970 | Haynes | 356/155 |
| 3,758,213 | 9/1973 | MacPherson et al. | 356/155 |

Primary Examiner—John K. Corbin
Assistant Examiner—Richard A. Rosenberger
Attorney, Agent, or Firm—Shlesinger, Fitzsimmons & Shlesinger

[57] ABSTRACT

To test the alignment of the front wheels of an automotive vehicle, the front wheels of the vehicle are driven onto a pair of spaced, parallel rollers, one of which is driven to effect rotation of the front wheels while the vehicle is standing motionless. The hubcaps are removed and a plane mirror is secured by a magnet to the hub of each front wheel. A laser beam is shone onto each mirror through a central hole in a chart. Means is provided for adjusting the the mirror angularly to tilt its plane relative to the axis of the associated spindle of the vehicle. Each mirror can be adjusted so that its plane is perfectly perpendicular to the axis of the spindle. Then the wheels can be accurately tested for toe, run-out and camber.

6 Claims, 9 Drawing Figures

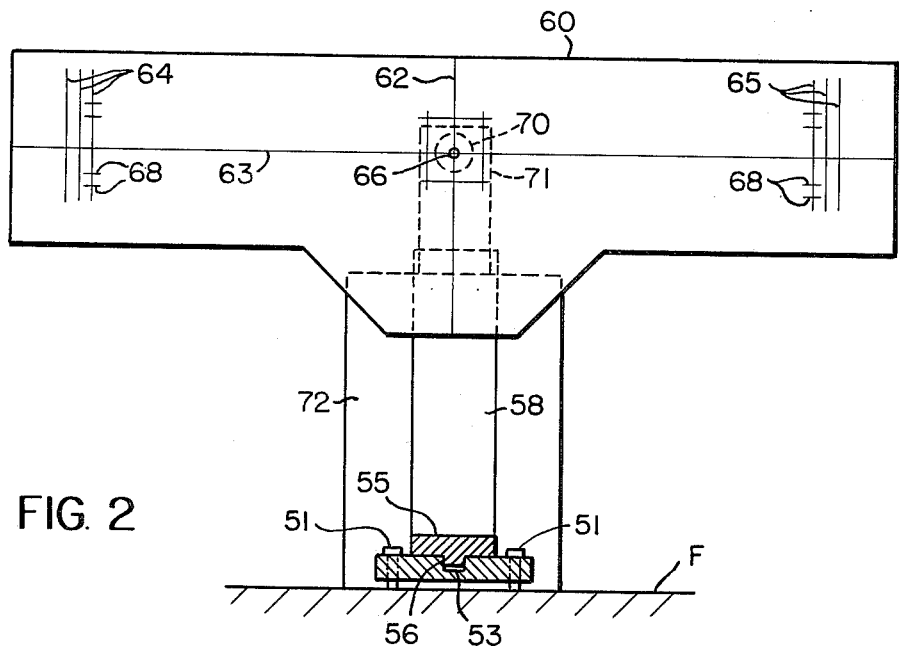
FIG. 2
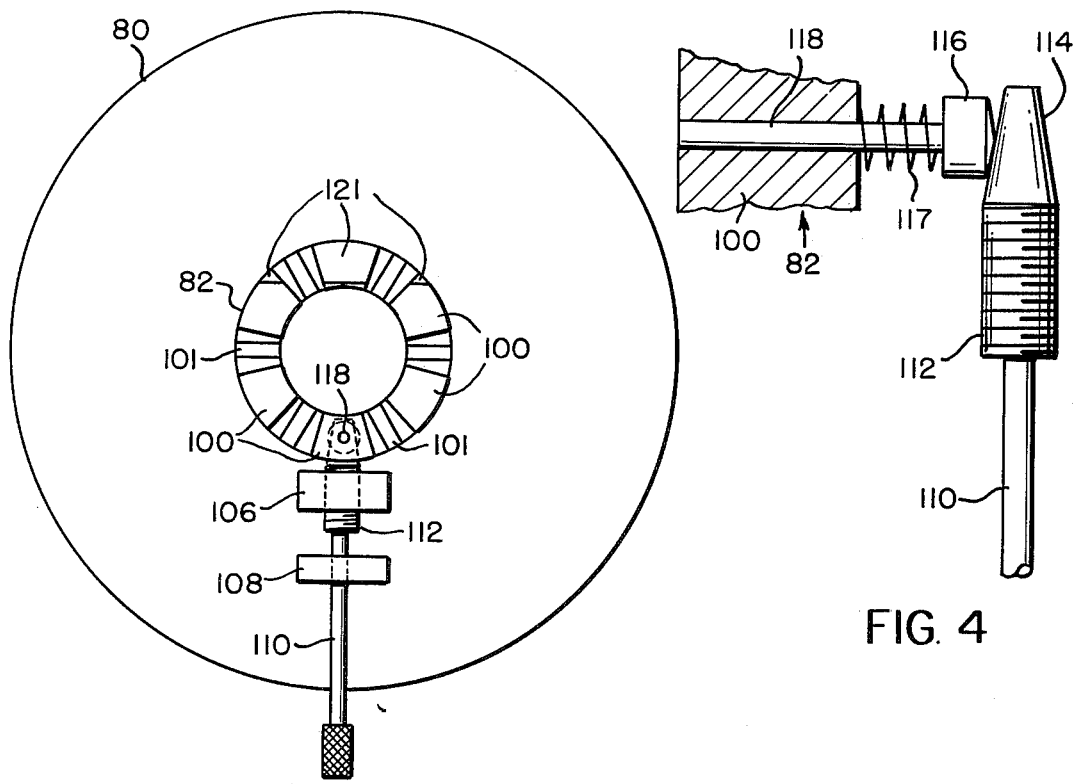
FIG. 3
FIG. 4

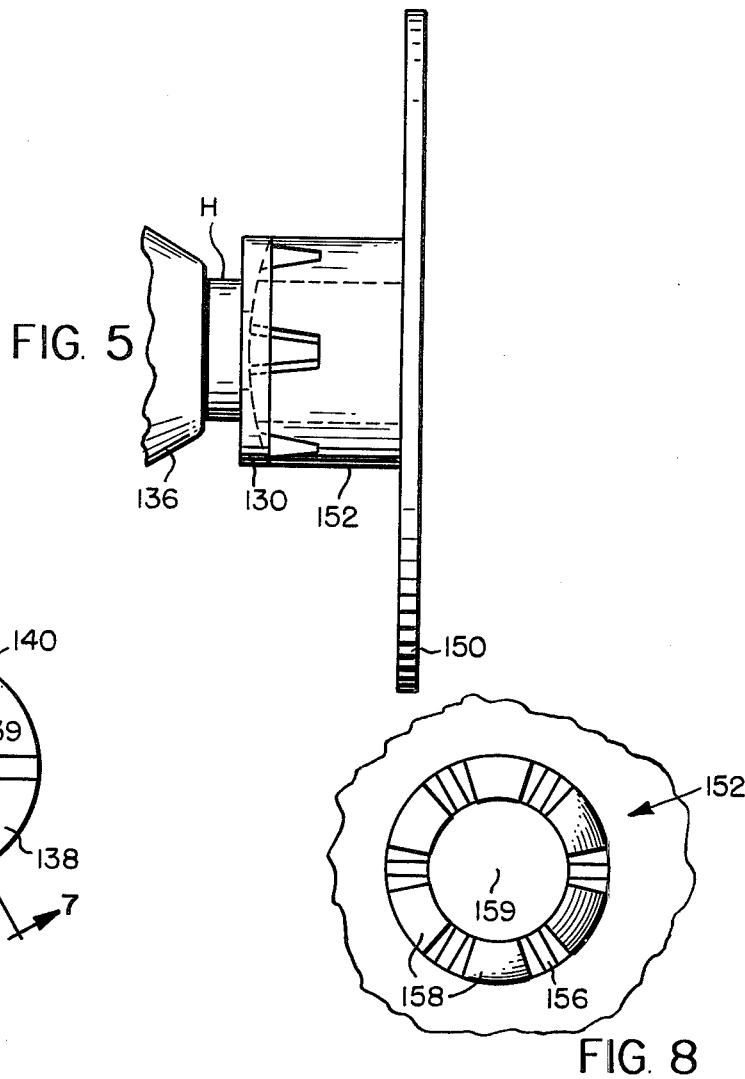
FIG. 5
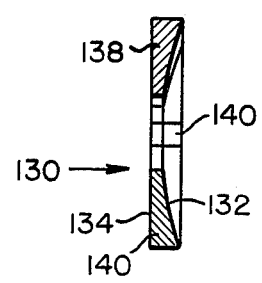
FIG. 6
FIG. 7
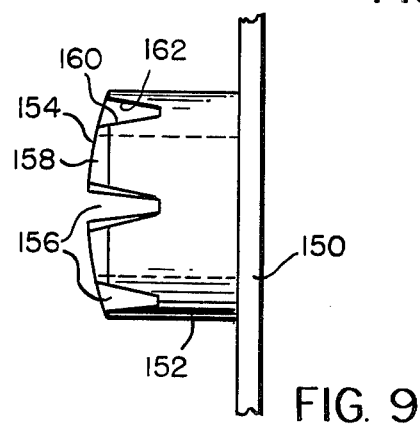
FIG. 8
FIG. 9

3,951,551

APPARATUS FOR TESTING THE FRONT WHEEL ALIGNMENT OF AUTOMOTIVE VEHICLES

The present invention relates to apparatus for testing the alignment of the front wheels of an automotive vehicle, and more particularly to an improvement on the apparatus disclosed in the joint U.S. patent of myself and Pierre A. Alsina, U.S. Pat. No. 3,758,213, issued Sept. 11, 1973.

In using the apparatus of U.S. Pat. No. 3,758,213, the hubcaps are removed from the front wheels of the vehicle and a plane mirror is secured by a magnet to the brake drum or disk hub of each front wheel to rotate with the wheel in a plane perpendicular to the associated wheel spindle. The front wheels of the vehicle are then driven onto a pair of spaced parallel rollers, one of which is driven to effect rotation of the wheels while the vehicle itself is motionless. A beam of light, such as a laser beam, is shone onto each mirror through a small central hole in a graduated chart that is spaced from each wheel; and this beam is reflected back onto the associated chart as a point of light which is offset horizontally and vertically from the hole in proportion to the toe and camber of the respective wheel.

The outer machined surface of the brake drum or disk hub of a wheel does not always run true with the bearing race of the wheel after assembly on the wheel spindle; in some cases the run-out may be as much as 0.005 inch. Any run-out, though, can result in an incorrect reading on the chart of toe and camber.

The primary object of this invention is to provide means for compensating for run-out of the brake drum or disk hub when it occurs. To this end it is an object of this invention to provide means for adjusting the mirror position angularly to offset any such run-out.

Other objects of the invention will appear hereinafter from the description and from the recital of the appended claims, particularly when read in conjunction with the accompanying drawings.

In the drawings:

FIG. 2 is a fragmentary sectional view on a slightly smaller scale, taken along the line 2—2 of FIG. 1 looking in the direction of the arrows;

FIG. 3 is an enlarged rear view showing the mirror and one means constructed according to the present invention for adjusting the mirror;

FIG. 4 is an enlarged view of this adjusting mechanism;

FIG. 5 is a side elevation, showing a modified form of mirror mounting;

FIG. 6 is an end view of the socket member of this mounting;

FIG. 7 is a section taken on the line 7—7 of FIG. 6 looking in the direction of the arrows;

FIG. 8 is a rear elevation of the hub of the mirror of this mounting; and

FIG. 9 is a fragmentary side view of this mirror and its hub.

Figure 1:
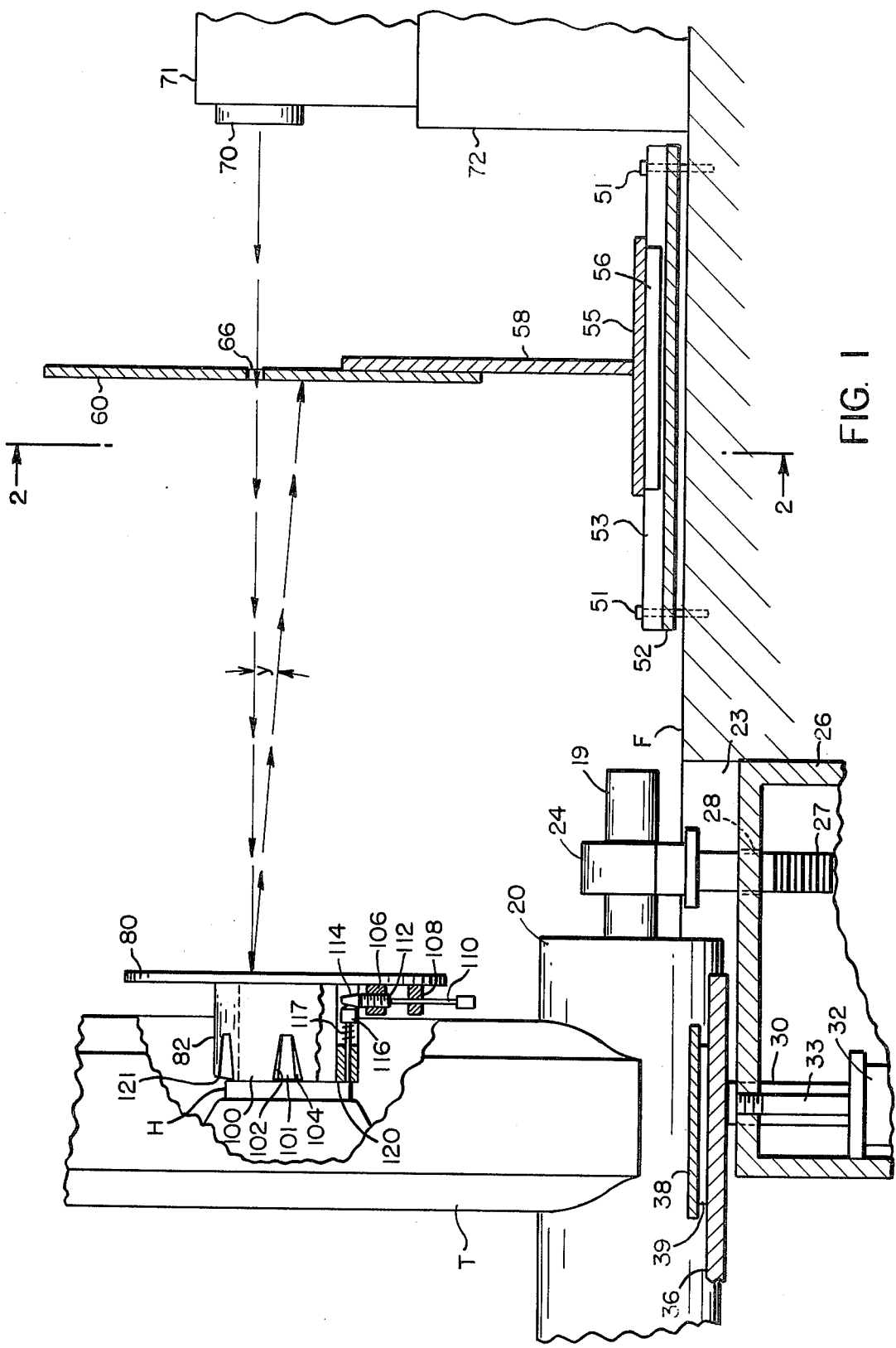
FIG. 1 is a fragmentary vertical sectional view of a front wheel alignment testing apparatus incorporating the improvement of the present invention.

Referring now to the drawings by numerals of reference, and first to the embodiment shown in FIGS. 1 to 4 inclusive, 20 denotes one of a pair of spaced, parallel rollers onto which the front wheels of a vehicle are driven to effect the front wheel alignment testing operation. Opposite ends of these rollers may be journaled in laterally-spaced pillow blocks 24, as described in U.S. Pat. No. 3,758,213, which support the rollers transversely across one end of a pit in the floor F of a garage or the like. At opposite sides of the pit each pair of blocks 24 is mounted for limited vertical adjustment in a shallow recess 23 in the floor F at one side of the pit.

The apparatus shown in FIG. 1 is duplicated at the opposite ends of the rollers 20, and for that reason the ensuing description will be confined to the apparatus associated with one wheel of the vehicle in the testing of the front wheel alignment.

Mounted in the floor F beneath the recess 23 is a housing 26. Spaced, parallel racks 27 are mounted in housing 26 adjacent the front and rear ends thereof, respectively, for vertical sliding movement. They project through registering openings 28 in the top of the housing 26 and are fastened rigidly to the underside of the pillow block 24.

A circular tire pad 38 is carried by a plate 36 which is rotatable on a slide 39 that is manually adjustable slidably on plate 36 in a direction parallel to the axis of roller 20. Plate 36 is adjustable vertically by a rack 30 to which the plate 36 is secured. Rack 30 is fastened to a cylinder 32 which is reciprocable vertically in housing 26. A piston (not shown) in cylinder 32 has a rod 33 fixedly threaded at its upper end into housing 26. Through gearing disclosed in U.S. Pat. No. 3,758,213 when a pad 38 is elevated, rollers 20 are lowered, and vice versa.

Fastened to the floor F by screws 51 is a base plate 52. In its upper surface plate 52 has a longitudinal groove 53 which extends parallel to rollers 20. A plate or slide 55, which is slidable on plate 53, has on its underside a longitudinally extending key 56 which projects slidably into the associated groove 53. Thus plate 55 is guided for sliding movement toward and away from one end of rollers 20.

Fastened to a vertical plate 58 carried by slide 55 and positioned to face the adjacent ends of rollers 20 is a flat, plane chart 60. Medially of its ends the face of chart 60 has a zero "toe" reference line 62 (FIG. 2) which lies in a vertical plane that extends centrally of the associated groove 56. Approximately medially of its upper and lower edges, chart 60 also has on its face a zero "camber" reference line 63, which intersects the "toe" reference line 62 at right angles. Adjacent opposite ends thereof, respectively, chart 60 has on its face spaced, vertical reference lines 64 and 65, respectively, for checking the turning radius of a vehicle's front wheels; and disposed transversely of one or more of the set of reference lines 65 are graduations 68 for reading caster.

At the intersection of its zero reference lines 62 and 63 chart 60 has therethrough a small, circular hole 66 which registers with the head 70 of a light source 71, such as a laser, which emits parallel light beams. Source 71 is mounted on the upper end of a stand 72 that is fixed on floor F outwardly or rearwardly of chart 60. Light source 71 is positioned so that, when properly calibrated, its light beam passes horizontally through the aperture 66 in chart 60.

During test the rollers 20 are rotated to transmit motion to the front wheels T of the vehicle. At the commencement of the test tire pads 38 for the two wheels may be disposed in elevated positions so that when the vehicle is driven onto the apparatus its two front wheels will rest directly on the pads 38. After the tires T have come to rest on the pads 38, the pads 38 are lowered and the rollers 20 are elevated to engage and support the tires T.

After the hubcaps and dust covers are removed from the front wheels of the vehicle to expose the hub portion of each wheel, polished aluminum mirrors 80 are secured to the outside of the front wheels by annular magnets 82 so that the reflective surfaces of the mirrors confront the cooperating charts 60.

All of the above is like the apparatus disclosed in U.S. Pat. No. 3,758,213 and reference may be had to that patent for a more detailed description thereof.

As stated above, the outer machined surface of the brake drum hub or disc hub does not always run true with the bearing race. To obviate this, an annular six-pole magnet 82 is mounted on each wheel. The magnet is formed with six equi-angularly spaced teeth 100 (FIG. 1) alternating with notches 101. Each notch has outwardly converging sides 102, 104. Journaled in bearings 106 and 108 on the back of mirror 80 is an adjustment screw 110 which has a threaded portion 112 which screws into a bearing 106. The screw has a conical end portion 114 which engages the head 116 of a cocking pin 118 (FIG. 4) that is mounted in one of the teeth 100 of the magnet, and is adapted to engage the face of the hub H (FIG. 1) of the wheel. One complete turn of the adjustment screw 110, for instance, may move the cocking pin 118 an 0.001 of an inch. A coil spring 117, which surrounds the cocking pin and is interposed between the head of the pin and the tooth 100 of the magnet, in which the pin is mounted, urges the head of the pin constantly into engagement with the conical head 114 of screw 110.

Before mounting the mirror magnet assembly 80–82 on the hub of the wheel the adjustment screw 110 should be backed out so that the cocking pin 118 does not protrude above the ground surface 120 of the magnet.

After mounting the mirror-magnet assembly, the wheel is spun and the laser is turned on. The amount of run-out of the mirror may be noted by observing the reflection of the laser beam on the chart 60. A wire loop held in place on the chart by a magnet may be used to locate precisely the camber and toe positions of the wheel. This loop may also be used to define and locate the amount of run-out of the laser beam reflection caused by mirror run-out when it occurs. If the laser reflection scribes a circle on the chart, the wheel is stopped and the radial location of the laser reflection is noted. The mirror-magnet assembly is then rotated on the hub H until the adjustment screw 110 is at the same radial position that the laser reflection represents, that is, at the position that corresponds to an imaginary line extending from hole 66 to the point of reflection of the laser beam from mirror 80 onto the chart. Thus, the adjustment screw may occupy a 2 o'clock position, a 10 o'clock position, etc. At this time the adjustment screw is turned, to tilt the mirror relative to a plane perpendicular to the wheel spindle, until the laser reflection location is at the center of the circle it scribed on the chart while the wheel was turning.

Two of the teeth of the magnet have slight chamfers 121 (FIG. 3) on them. This gives the magnet stability due to line and point contact when the cocking pin is used.

If the described adjustment procedure is followed the laser reflection on each chart will stand still when the wheel is spun by the rollers. When this occurs the mirror is spinning in a plane perfectly perpendicular to the axis of the wheel, regardless of run out of the wheel and tire assembly. Once the laser beam reflection has been properly adjusted, the alignment of the front wheels of the vehicle can be tested as described in U.S. Pat. No. 3,758,213.

FIGS. 5 and 9 show a modified mirror mounting. Here a socket member 130 having a dished concave outer spherical surface 132 and a flat, plane rear surface 134 is abutted against the hub H of wheel spindle 136. The socket member has magnetized steel ribs 138 alternating with narrower non-magnetic brass ribs 140 around its axis 139 and is held to the hub of the wheel by magnetism.

The mirror 150 has a hub 152 which has a convex rear face 154 complementary to the concave spherical surface 132 of shim 130 to seat thereon with universal angular adjustment thereon. As with the first described embodiment of the invention, the hub 152 of the mirror is notched at 156 to provide teeth or protuberances 158 equiangularly spaced about its axis 159. The sides 160, 162 of the notches converge forwardly. The hub 152 is magnetized, being held by its magnetism in any adjusted position on the associated shim 130.

The mirror mounting of FIGS. 5 to 9 is used in a manner similar to that of FIGS. 1 to 4. The wheels are spun while the laser beams are turned on and the positions of the beams reflected by the mirror on the chart 60 is noted; and the mirror 150 is manually adjusted on shim 130 until the reflected beams are centered on the chart. Then the alignment tests can be made as described above.

While the invention has been described in connection with specific embodiments thereof, it will be understood that it is capable of modification, and this application is intended to cover any modifications of the invention that come within the scope of the invention or the limits of the appended claims.

Having thus described my invention, what I claim is:

1. In apparatus for checking the alignment of the front wheels of an automotive vehicle comprising
   a target having an opening therethrough,
   means for rotating the front wheels of a vehicle while the vehicle is motionless,
   magnetic means for releasably mounting a reflecting surface on the hub of a front wheel for rotation thereby in confronting relation to the target,
   a light source for projecting parallel beams of light through the opening in said target and onto said reflecting surface for reflection thereby back onto said target,
   the improvement wherein said magnetic mounting means comprises means for tilting said reflecting surface angularly relatiive to a plane perpendicular to the axis of the spindle of the vehicle on which the front wheel is mounted, and including
   an annular magnet having a plurality of notches at its rear equiangularly spaced about its axis and alternating with teeth which constitute poles, and
   some of said teeth being chamfered on their rear ends for contact with the hub of the wheel.

2. In apparatus for checking the alignment of the front wheels of an automotive vehicle comprising
   a target having an opening therethrough,
   means for rotating the front wheels of a vehicle while the vehicle is motionless,
   magnetic means for releasably mounting a reflecting surface on the hub of a front wheel for rotation thereby in confronting relation to the target, a light source for projecting parallel beams of light through the opening in said target and onto said reflecting surface for reflecting thereby back onto said target, the improvement wherein said magnetic mounting means comprises means for tilting said reflecting surface angularly relative to a plane perpendicular to the axis of the spindle of the vehicle on which the front wheel is mounted, and including an annular magnet having a plurality of angularly spaced teeth at its rear, and said tilting means comprises a cocking pin reciprocably mounted in one of said teeth for rectilinear adjustment against the outer face of the wheel hub, and means for adjusting the rear end of said pin into engagement with the hub of said wheel.

3. Apparatus as claimed in claim 2, wherein said cocking pin has a conical head at its outer end, and said adjusting means comprises a screw threaded into said magnet perpendicular to said pin and having a conical head at its inner end engaging the conical head of said screw.

4. In apparatus for checking the alignment of the front wheels of an automotive vehicle comprising a target having an opening therethrough, means for rotating the front wheels of a vehicle while the vehicle is motionless, magnetic means for releasably mounting a reflecting surface on the hub of a front wheel for rotation thereby in confronting relation to the target, a light source for projecting parallel beams of light through the opening in said target and onto said reflecting surface for reflection thereby back onto said target, the improvement wherein said magnetic mounting means comprises means for tilting said reflecting surface angularly relative to a plane perpendicular to the axis of the spindle of the vehicle on which the front wheel is mounted, and including an annular shim having a plane rear surface seated against the outer face of the hub of the wheel and an outer concave spherical surface, and a hub to which said reflecting surface is secured which has a convex spherical rear surface complementary to the concave spherical surface of the shim.

5. Apparatus as claimed in claim 4, wherein the last-named hub is provided with a plurality of notches equiangularly spaced around its axis to form a plurality of poles alternating with said notches.

6. Apparatus as claimed in claim 4, wherein said shim is formed of non-magnetic strips alternating with strips of magnetic material around its axis.

* * * * *